United States Patent

[11] 3,625,964

| [72] | Inventors | Perry A. Argabright<br>both of Littleton;<br>Brian L. Phillips, Littleton; Charles H. De Puy, Boulder, all of Colo. |
|---|---|---|
| [21] | Appl. No. | 872,380 |
| [22] | Filed | Oct. 29, 1969 |
| [45] | Patented | Dec. 7, 1971 |
| [73] | Assignee | Marathon Oil Company<br>Findlay, Ohio<br>Continuation-in-part of application Ser. No. 682,545, Nov. 13, 1967, now abandoned. This application Oct. 29, 1969, Ser. No. 872,380<br>The portion of the term of the patent subsequent to Dec. 22, 1987, has been disclaimed. |

[54] PRODUCTION OF METAL SALTS OF DIORGANO SUBSTITUTED ISOCYANURATES
10 Claims, No Drawings

| [52] | U.S. Cl. | 260/248 NS, 424/249, 252/75 |
|---|---|---|
| [51] | Int. Cl. | C07d 55/38 |
| [50] | Field of Search | 260/248 NS |

[56] References Cited
UNITED STATES PATENTS

| 2,536,849 | 1/1951 | Kaiser et al. | 260/248 |
| 2,866,801 | 12/1958 | Himel et al. | 260/248 X |
| 2,977,360 | 3/1961 | Dixon | 260/248 |
| 3,108,100 | 10/1963 | Tate et al. | 260/248 |
| 3,249,607 | 5/1966 | Taub et al. | 260/248 |
| 3,367,934 | 2/1968 | Tate et al. | 260/248 |

*Primary Examiner*—John M. Ford
*Attorneys*—Joseph C. Herring, Richard C. Willson and Jack L. Hummel ABSTRACT: Substituted isocyanurates containing from two to three substituents per molecule are prepared from 1,3-diaryluretediones by reacting 1,3-diaryluret-ediones with metal cyanates in a reaction mixture containing a dipolar aprotic solvent. Thereafter, this metal salt of a substituted isocyanurate may be reacted with a mineral acid in aqueous solution to form a disubstituted isocyanurate as a precipitate, or, may be reacted with an organic halide to form a trisubstituted isocyanurate.

The products of the invention are useful as intermediates in the production of pharmaceuticals, insecticides, disinfectants, and in the preparation of polymers.

PRODUCTION OF METAL SALTS OF DIORGANO SUBSTITUTED ISOCYANURATES

The products of the invention are useful as intermediates in the production of pharmaceuticals, insecticides, disinfectants, and in the preparation of polymers.

CROSS REFERENCES TO RELATED APPLICATIONS

This application is a continuation-in-part of copending U.S. Pat. application, Ser. No. 682,545, filed Nov. 13, 1967, now abandoned.

BACKGROUND OF THE INVENTION

This invention relates principally to the formation of metal salts of disubstituted isocyanurates and derivatives thereof. The metal salts of disubstituted isocyanurates can be characterized by the following formula:

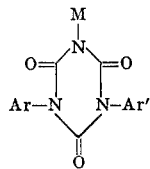

where M is an alkali or alkaline earth metal of Group I or Group II of the Periodic Table and where Ar and Ar' are aryl groups or noninterfering substituted derivatives thereof and may or may not by identical.

A good source in the area of this invention is s-Triazines and Derivatives, by Smolin and Rapoport, 1959, which discloses the existence of only three disubstituted isocyanurates: diethyl isocyanurate; dimethyl isocyanurate; and diphenyl isocyanurate.

In each of the preparations of these compounds disclosed in the art, at least one of the following serious drawbacks is encountered: first, low yields of the di-isocyanurate product are encountered and second, complex mixtures represented by the following compounds are produced which are extremely difficult to separate, especially the separation of I from II.

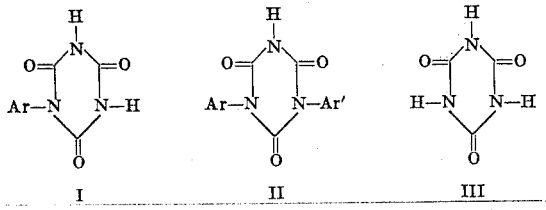

The art of preparing disubstituted isocyanurates has been restricted not only to the few compounds which have been obtained but also to the poor yields and difficult-to-separate complex mixtures formed from the preparations known to the art. The present invention overcomes the obstacles present in the art in disclosing a process for the preparation of a multitude of disubstituted isocyanurates which are recovered in yields of up to and even greater than 80 percent of product mixture. Furthermore, the product mixture does not contain the complex mixtures of compounds recited above.

An additional problem that exists is the relatively high cost of reactants utilized in the processes known in the art. In contrast, the reactants and reaction conditions of the present invention, as well as the excellent yield of disubstituted isocyanurates obtained, constitute an extremely economical process.

SUMMARY OF THE INVENTION

The basic invention can be described as a process for preparing metallic disubstituted isocyanurates which are excellent intermediates in the preparation of a multitude of isocyanurate derivatives. The synthesis of these products is a one-step process comprising the reaction of 1,3-diarylu- retediones and metallic cyanates in the presence of a suitable solvent to produce the desired disubstituted metallic isocyanurate. The sole byproduct is the corresponding trisubstituted isocyanurate. The yield of the product may be enhanced by the proper selection of reactants, reaction conditions, and solvent, as will be described in the description of the preferred embodiments of this invention.

From the metallic salts of disubstituted isocyanurates many products may be formed through simple substitution, addition or other reactions. Specifically, the addition of a mineral acid to an aqueous solution of the metallic salt will precipitate the corresponding disubstituted isocyanuric acid.

Mixed or symmetrically trisubstituted isocyanurate salts may be formed by conversion of the metal salts of the disubstituted isocyanuric acids by contacting said metal salts with an organic halide of the form RX, where R is preferably a substituted or unsubstituted aliphatic or aromatic radical and X is any of the Group VII elements of the Periodic Table, but is preferably chlorine. If one desires the symmetrically trisubstituted isocyanurate, R must be the same as that used in the initial reaction producing the disubstituted metal salt, otherwise the product will be a mixed trisubstituted isocyanurate salt. A variety of different products may be formed by simple choice of compound to be reacted with the metallic salt of a disubstituted isocyanurate formed in accordance with this invention.

The products of this invention may be used for many different functions, some of which are intermediates in the production of pharmaceuticals, insecticides, disinfectants, and in the preparation of polymers. For instance, products of the structural formula:

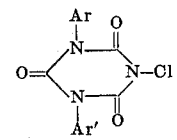

wherein Ar and Ar' are aryl or noninterfering substituted derivatives thereof, which are disubstituted chloroisocyanurates, can be used effectively as disinfectants. As another example, an intermediate of the structural formula:

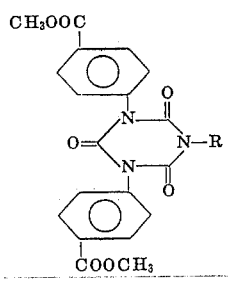

wherein R is an aryl, alkyl, or alkyl aryl group is used in the preparation of polymers with excellent inherent UV absorbence. The above compound is synthesized in accordance with the present invention by first preparing the metallic bis(p-carbomethoxyphenyl) isocyanurate followed by reaction with a suitable organic halide, i.e. benzyl chloride.

Products made in accordance with this invention generally have excellent thermal stability. These examples are only a sampling of the vast scope of uses for the products made by the process of this invention.

PREFERRED EMBODIMENTS OF THE INVENTION

The basic process of the invention is described by the following reaction:

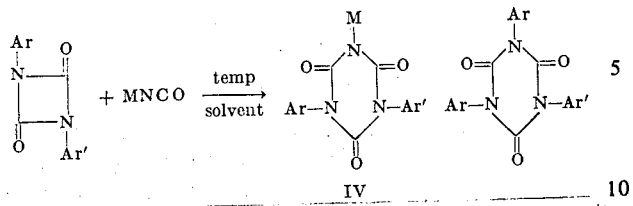

where Ar and Ar' may be aryl, such as

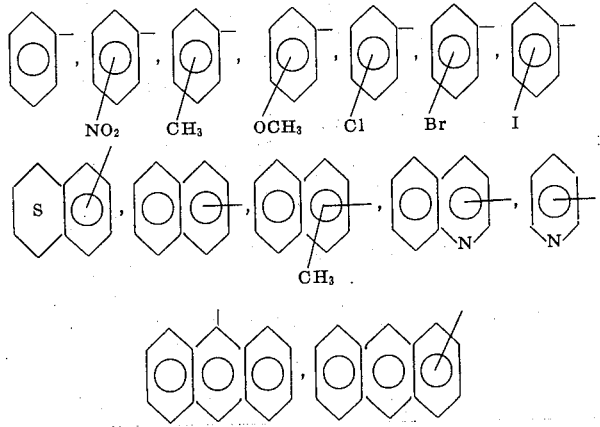

or
derivatives thereof containing noninterfering (to a substantial degree) substituents. Examples of 1,3-diaryluretediones useful for this invention are: 1,3-di(m-methoxyphenyl) uretedione, 1,3-diphenyl uretedione, 1,3-di-α-furyl uretedione, 1-phenyl-3-p-tolyl uretedione, 1β-napthyl-3-p-chlorophenyl uretedione, 1,3-di(p-methyl mercaptophenyl) uretedione, 1,3-di-(m-dodecyl phenyl) uretedione, 1,3-di(2,4-dichlorophenyl) uretedione, and 1-phenyl-3α-pridyl uretedione.

M is preferably selected from the Group I or Group II metals of the Periodic Table, and more preferably from the group consisting of lithium, potassium, sodium, rubidium, or cesium; and is most preferably potassium.

The aprotic solvents having utility in this connection are characterized in that (1) they are liquid under the conditions of the reaction; (2) they have a high dielectric constant, i.e. greater than about 15 at 25° C.; (3) they preferably are dipolar, that is, one part of the molecule has a more positive electrical charge relative to the other parts of the molecule thereby causing the molecule to act as a dipole; (4) they are sufficiently inert not to enter into deleterious side reactions to any appreciable extent under the conditions of the reaction; and (5) they do not possess hydrogen atoms capable of hydrogen bonding with or transferring to anions in solution in the reaction mixture.

In general the above reaction is preferably carried out at a temperature range of from about 0° to 250° C., more preferably from about 25° to 200° C., and most preferably from about 50° to 150° C. The optimum temperature will depend upon the reactants and the solvent used. The pressure of the reaction is generally not critical but may depend upon the reaction temperature. If the reaction temperature and pressure is such that either the solvent or the 1,3-diaryluretediones are gaseous at that particular temperature, then the pressure should be made sufficiently greater than the normal reaction pressure of one atmosphere to prevent the reactants from escaping into the gaseous phase. To this end, pressures of the order of from about 1 to 30, usually about 5 to about 10, atmospheres are sufficient. In the above reaction, optimally it is preferred that one mole of 1,3-diaryluretedione reacts with one mole of metallic cyanate to form one mole of disubstituted isocyanurate designated above as IV. However, the ratio of moles of metallic cyanate per mole of 1,3-diarylu-retediones may range up to 5.0. The ratio of dipolar aprotic solvent to 1,3-diaryluretediones should preferably be from about 0.2 to 20, and more preferably from about 1.0 to 5.0 liters of solvent per mole of 1,3-diaryluretediones, although this amount is not narrowly critical.

The yield of product IV was determined by the following ratio:

$$\frac{\text{moles of 1,3-diaryluretediones converted to product IV}}{\text{total moles of 1,3-diaryluretediones converted}}$$

Another aspect of this invention is the process for preparing disubstituted isocyanurates formed by the addition of a mineral acid to the product IV formed above. The mineral acids can be selected from the group consisting of dilute hydrochloric acid, sulfuric acid, phosphoric acid, and nitric acid, etc. Since the metallic salts (product IV above) are slightly basic in aqueous solution, the mineral acid is added to the mixture until the solution just becomes acidic. The product formed is a disubstituted isocyanurate, is easily recovered by simple filtration.

Another aspect of this invention utilizes product IV above by combining with it an organic halide to produce the corresponding trisubstituted isocyanurate. The reactions of the isocyanurate metal salts with the mineral acids and the organic halides are substitution reactions with a byproduct of a corresponding metallic halide. The preferred molar ratio of organic halide to metallic salt is about 1.0 but may be as large as 5.0.

The yield of the metallic salt of a disubstituted isocyanurate prepared according to the present invention was found to be up to or even greater than about 80 percent by using a temperature of 75° C. at one atmosphere, sodium cyanate as the metal cyanate, dimethyl formamide as the solvent and 1,3-diphenyluretedione as the disubstituted uretedione.

The following examples illustrate the invention but are not to be construed as limiting it in any way:

EXAMPLE I

To 30.0 g. phenyl isocyanate is added 3 drops triethylphosphine. The mixture is chilled with an ice bath and crystals form immediately upon addition of the triethylphosphine. The mixture is allowed to react two hours at near 0° C. About 150 ml. of dry diethyl ether is added to the reaction product, and the crystalline mass is broken up, collected by filtration and dried to give 29.1 g. One recrystallization from dry benzene gives pure 1,3-diphenyluretedione, melting point 178°-178.5° C.

A solution of 5.0 g. (21.0 mmole) of the above prepared 1,3-diphenyluretedione in 100 ml. dry DMF is heated to 75° C. To this solution is added 1.62 g. (25.0 mmole) dry sodium cyanate, and the mixture is stirred at temperature for 2 hours. The cooled reaction mixture is filtered, and the DMF is distilled off from the filtrate (in vacuo). The residue thus obtained is stirred overnight with 50 ml. distilled water and the insoluble material collected by filtration and dried, wt. 0.90 g. The aqueous filtrate is acidified via a dropwise addition of concentrated HCl. The white precipitate which forms is filtered off and dried to yield 3.63 g. (61 percent yield). The first product isolated is identified as triphenyl isocyanurate (m.p., infrared spectrum, NMR spectrum). The product obtained on acidifying the filtrate is found to be diphenyl isocyanurate. No unreacted 1,3-diphenyluretedione was found.

EXAMPLE II

Same as example I, except that 1.70 g. of potassium cyanate (KNCO) is the metal cyanate employed. The yield of diphenyl isocyanurate is 4.70 g. (79 percent yield).

EXAMPLE III

Same as example I, except dimethyl sulfoxide (DMSO) is used as the solvent. The yield of diphenyl isocyanurate is 4.72 g. (80 percent yield).

EXAMPLE IV

Same as example I, except that 5.59 g. of 1,3-di-o-tolyl uretedione is used as a starting material, and KNCO is the metal cyanate employed. The yield is 4.50 g. (69 percent yield of di-o-tolyl isocyanurate.

EXAMPLE V

Same as example I, except 5.30 g. of 1-phenyl-3-p-tolyl uretedione is used as a starting material. The yield is 4.33 g. (70 percent yield) of 1-phenyl-3-p-toly isocyanurate.

We claim:

1. A process for the production of metal salts of diorgano substituted isocyanurates comprising in combination the steps of reacting 1,3-diaryluretediones, in which the aryl groups are one to 30 carbon atom rings selected from the group consisting of carbocyclic and monoherto heterocyclic rings, with metal cyanates characterized by the formula $M(NCO)_n$ where M is an alkali or alkaline earth metal selected from Group I or Group II of the Periodic Table and n is the oxidation number of the metal, in an aprotic solvent which is liquid under the conditions of the reaction, which has a dielectric constant greater than about 15°–25° C., in which one part of the molecule has a more positive electrical charge relative to the other parts of the molecule thereby causing the molecule to act as a dipole, which is sufficiently inert not to enter into deleterious side reactions to any appreciable extent under the conditions of the reactions, and which does not possess hydrogen atoms capable of hydrogen bonding with or transferring to anions in solution in the reaction mixture at a temperature of from about 0° to about 250° C., and wherein there are present from about 0.2 to about 20 liters of solvent per mole of uretedione present in the reaction mixture.

2. The process of claim 1 wherein there are present in the reaction mixture from about 0.1 to about 10 moles of metal cyanate per mole of uretedione.

3. The process of claim 1 wherein the 1,3-diaryluretediones are characterized by the formula:

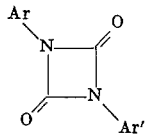

where Ar and Ar' are aryl groups selected from the group consisting of:

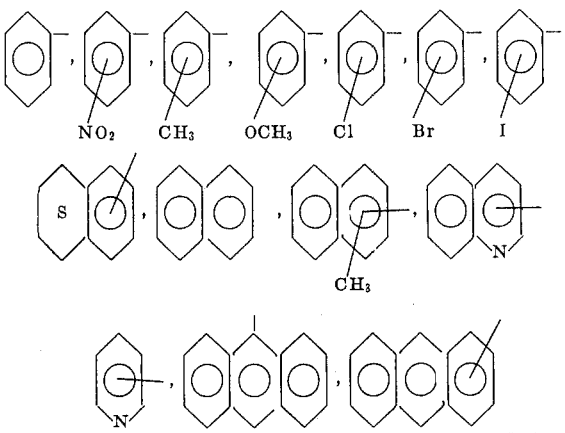

and may or may not be identical and contain from one to about 30 carbon atoms.

4. The process of claim 1 wherein the metal cyanates are characterized by the formula $$M(NCO)_n$$

where M is an alkali or alkaline earth metal selected from Group I or Group II of the Periodic Table and $m$ is the oxidation number of the metal.

5. The process of claim 1 wherein the aprotic solvent is a dipolar aprotic solvent.

6. The process of claim 1 wherein the temperature range is from about 50° to 150° C.

7. The process of claim 1 wherein the 1,3-diaryluretedione is 1,3-diphenyluretedione.

8. The process of claim 1 wherein the metal cyanate is sodium cyanate.

9. The process of claim 5 wherein the dipolar aprotic solvent is dimethyl formamide.

10. The process of claim 2 wherein there are present in the reaction mixture about 1.0 moles of metal cyanate per mole of uretedione.

* * * * *

PO-1050
(5/69)

UNITED STATES PATENT OFFICE
CERTIFICATE OF CORRECTION

Patent No. 3,625,964                    Dated December 7, 1971

Inventor(s) Perry A. Argabright, et al

It is certified that error appears in the above-identified patent and that said Letters Patent are hereby corrected as shown below:

Col. 3, line 55:   Delete "reaction;"

Claim 1, line 7:   "monoherto" should read --monohetero--

Claim 3, line 10:  Second double ring should read as follows:

Claim 4, line 31:  "m" should read --n--

Signed and sealed this 30th day of May 1972.

(SEAL)
Attest:

EDWARD M. FLETCHER, JR.              ROBERT GOTTSCHALK
Attesting Officer                    Commissioner of Patents